Figure 2:
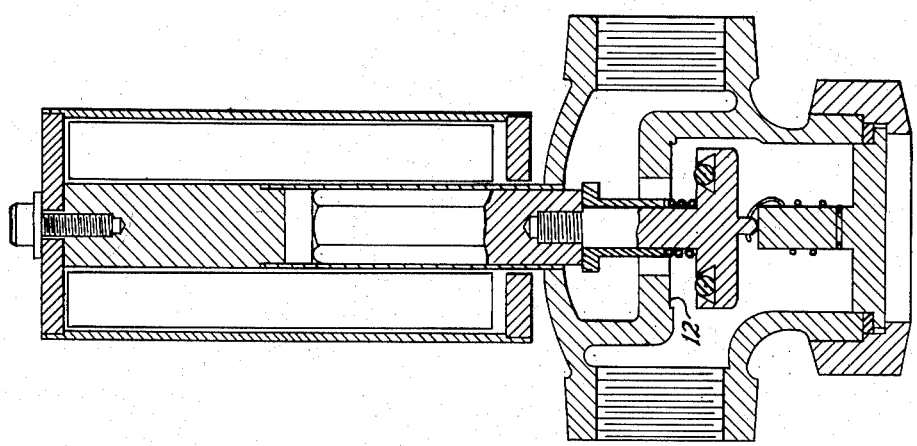

March 3, 1953      G. R. NAGEL      2,630,139

SOLENOID VALVE

Filed July 19, 1946

G. R. NAGEL
INVENTOR.

BY W. H. Cannon

ATTORNEY

Patented Mar. 3, 1953

2,630,139

UNITED STATES PATENT OFFICE 2,630,139

SOLENOID VALVE

Gerhard R. Nagel, Rochester, N. Y., assignor, by mesne assignments, to Eastman Kodak Company, Rochester, N. Y., a corporation of New Jersey Application July 19, 1946, Serial No. 684,804

4 Claims. (Cl. 137—719)

This invention relates to an improved solenoid valve for use in vacuum apparatus where it is desirable to release the vacuum in one part of the apparatus while maintaining it in the remainder.

Solenoid valves are of the following two classes:
1. Electromagnetic attraction opens the valve.
2. Electromagnetic attraction closes the valve.

Each of these classes is one of the following types:
   (a) Atmospheric pressure tends to open valve.
   (b) Atmospheric pressure tends to keep valve closed.

The four possible variations are 1(a), 1(b), 2(a), and 2(b).

Class 1(a) valves have electromagnetism and atmospheric pressure working together to open the valve. In closing the valve it is necessary to have a spring sufficiently powerful to close the valve against atmospheric pressure. This type of valve is not practical in vacuum work for the reason that a spring which will close the valve against atmospheric pressure and seal the system from leakage must be disproportionately strong necessitating the use of an oversize electromagnet.

Class 1(b) valves have electromagnetism to open valve and atmospheric pressure tending to keep valve closed. With this valve a light spring is sufficient to insure that the valve will close when the electromagnetic attraction ceases. This type of valve has one great drawback in vacuum work. When in the closed position the valve disk is at its maximum distance from the electromagnet. Here the magnetic attraction is at the minimum but the magnet is called on to produce its maximum attractive force. If there is any sticking of moving parts in the closed position the valve will not open.

Class 2(a) valves have electromagnetism to close valve and atmospheric pressure tending to open valve. For many applications this valve is satisfactory. It is not positive acting where the valve is connected to a large capacity vacuum line open to the atmosphere. Air rushing into the valve tends to keep the valve disk in the position of least magnetic attraction and unless the electromagnet is disproportionately large and strong there will not be sufficient magnetic force to close the valve.

My invention covers a type of class 2(b) valve. Class 2(b) valves have electromagnetism and atmospheric pressure working together to close the valve. A powerful spring must operate to open the valve against the atmosphere upon release of the magnetic force. If a single strong spring of large amplitude is used in this application the electromagnet must be strong enough to act on the spring when valve is open. An electromagnet strong enough to accomplish this generates too much heat. The electromagnet is on the vacuum side of the valve where heat transfer is poor and if the valve is kept closed for as long as twenty-four hours the magnetic coil is apt to burn out.

This invention has for its object to provide a positive acting solenoid valve which has none of the objectionable features listed above. Another object is to provide a valve with a gasket which will eliminate leaks. A still further object is to improve the state of the art. Other objects will appear hereinafter.

These and other objects are accomplished by my invention which includes a solenoid which actuates a core mechanism to close the valve upon completion of an electromagnetic circuit through the solenoid, a metal disk with gasket, a heavy coil spring which opens the valve as soon as electromagnetic attraction between coil and core mechanism ceases, and a light coil spring to aid in opening the valve.

In the following description I have set forth the preferred embodiment of my invention, but it is to be understood that this is given by way of illustration and not in limitation thereof.

Figure 1:
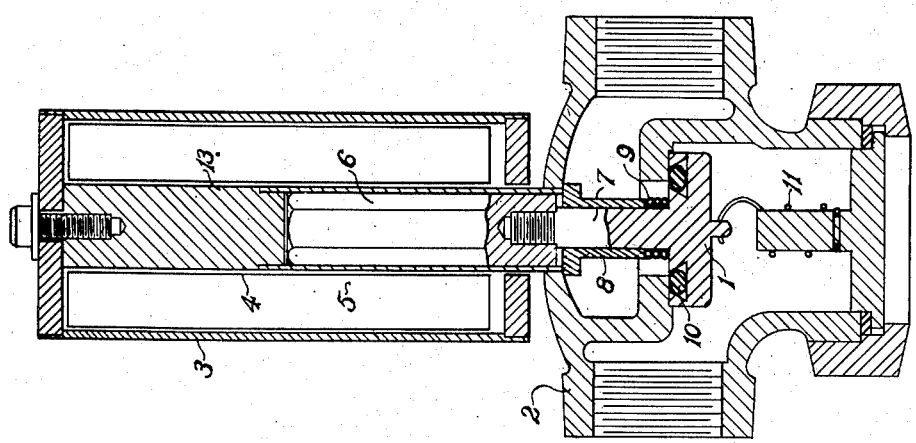

In the accompanying drawings Fig. 1 is a sectional view of my improved valve in closed position. Fig. 2 is a sectional view of the same valve when open.

In Fig. 1 the valve is shown in cross section. The disk 1 is in closed position. The right side is under vacuum. The left side may be under vacuum or may be open to the atmosphere. When the left side is open to the atmosphere, atmospheric pressure helps to keep disk 1 in place and the valve closed. Numeral 2 designates the valve housing. Numeral 3 designates the coil housing which is connected to the valve housing, both acting as a seal against the atmosphere. Numeral 4 designates a tube around which turns of wire 5 are wound to form the magnetic coil. Numeral 7 designates a coil core rigidly connected to disk 1 by means of shaft 7. Shaft 7 slides through movable collar 8 which is restricted in its movement toward coil 5 by the valve housing. Numeral 9 designates a heavy, unanchored, coil spring which is compressed between collar 8 and disk 1 when the valve is closed. Numeral 10 designates a gasket made of sponge rubber or similar compressible material. Numeral 11 designates a light coil spring which is stretched when the valve is closed. This spring is anchored at both ends. Numeral 12 designates the valve seat. Numeral 13 designates an iron core immovably fixed inside shaft 7 and extending about half the length of shaft 7.

In operation the valve is in the closed position (Fig. 1) when the electromagnetic circuit is closed. In addition to the magnetic attraction there is an atmospheric pressure amounting approximately to 15 lbs. per square inch of surface enclosed by disk gasket 10 tending to keep the valve closed. In the closed position coil springs 9 and 11 tend to open the valve although coil spring 11 is of little effect.

When the electromagnetic circuit is opened, atmospheric pressure, residual magnetism, and friction are the only forces opposed to the opening of the valve, and spring 9 is of sufficient strength to overcome these forces. Spring 9 then forces disk 1 in the direction away from the coil until the lost motion between collar 8 and the lower end of coil core 6 is taken up, this opens the valve slightly and allows the pressure on both sides to equalize. Once this has been accomplished spring 9 ceases to operate and spring 11 takes over to complete the opening of the valve. Spring 11 is only of sufficient strength to accomplish this complete opening.

When the valve is open only the light force exerted on disk 1 by spring 11 tends to keep it open. Upon application of the magnetizing current to coil 5 disk 1 is easily attracted toward the coil against the weak opposing forces of friction and spring 11. Toward the end of its travel disk 1 impinges upon spring 9 which strongly opposes the attraction of magnetized coil 5. However, by the time disk 1 reaches this point the increasing magnetic attraction of coil 5 is sufficient to compress spring 9 and effect metal-to-metal contact between disk 1 and valve seat 12.

Gasket 10 is made of soft rubber or similar material in the shape of a doughnut, or torus. It is under slight compression as a seal but most of the force is taken up by the metal-to-metal contact of disk 1 and valve seat 12. The depression in which the gasket lies is formed in such a shape that the gasket has room for expansion within the depression when metal-to-metal contact of disk 1 and valve seat 12 closes the valve.

Coil core 6 is constructed in the form of a hexagon in order to decrease the possibility of sticking in the event of some gummy substance forming on the wall of tube 4. A gap of 0.002" to 0.008" is left between core 6 and immovable core 13 in order to reduce residual magnetism.

By my combination of a powerful spring of small amplitude to snap open disk 1 against atmospheric pressure and a weak spring of large amplitude to complete the opening of disk 1 I have obviated the difficulties encountered in the use of a single spring and have provided an instrument of quickacting dependability.

What I claim is:

1. A valve assembly especially adapted for use in vacuum systems, said valve assembly comprising a valve housing, partition means dividing said valve housing into a low pressure chamber and a higher pressure chamber, a valve opening through said partition means, a valve seat in said higher pressure chamber around said valve opening, an inlet port opening into said low pressure chamber, an outlet port opening from said higher pressure chamber, valve closure means mounted for movement into and out of closing relation with said valve seat, electromagnetic means arranged for urging said valve closure into closing relation with said valve seat, a compression spring on the low pressure chamber side of said valve closure means with one end of said spring facing said valve closure means, means positioned between said valve housing and the opposite end of said compression spring and being adapted to prevent movement of said spring away from said valve closure means whereby said spring is compressed during movement of said valve closure member into closing relation with said valve seat, said compression spring being dimensioned for urging said valve closure means a relatively short distance out of closing relation with said valve seat, a tension spring disposed on the opposite side of said valve closure means from said compression spring, one end of said tension spring being secured to said valve closure means, the other end of said tension spring being secured to said valve housing, said tension spring being of substantially greater amplitude but of substantially lesser power than said compression spring, said tension spring being dimensioned and arranged to be tensioned during movement of said valve closure means into closing relation with said valve seat and for continuing movement of said valve closure means to the open position after said means is initially moved out of closing relation by said compression spring.

2. In a valve especially adapted for use in vacuum system, a valve housing, a partition member dividing said housing into an evacuable chamber and an atmospheric pressure chamber and having a valve opening therethrough intercommunicating said chambers, a valve seat on said partition member in said atmospheric chamber, a valve closure member mounted for reciprocating movement into and out of sealing engagement with said valve seat, electromagnetic means arranged for moving said valve closure member into engagement with said valve seat, a compression spring arranged to be compressed by said valve closure member during movement of said member into engagement with said valve seat, means coacting with said valve housing for limiting movement of said compression spring during movement of said valve closure member into engagement with said valve seat, said compression spring being effective to initiate movement of said valve closure member out of engagement with said valve seat when said electromagnetic means is deenergized, a tension spring of less strength than said compression spring positioned in said atmospheric pressure chamber, one end of said tension spring being attached to said valve closure member, the other end of said tension spring being secured to said valve housing, said tension spring being arranged to be tensioned during movement of said valve closure member into engagement with said valve seat, said tension spring being effective to complete the movement of said valve closure member out of engagement with said valve seat following initiation of such movement by said compression spring.

3. In a solenoid valve assembly especially adapted for vacuum equipment, a valve housing divided by a partition member into an evacuable chamber and an atmospheric pressure chamber, a valve opening through said partition member intercommunicating said chambers, a valve seat in said atmospheric pressure chamber and on said partition member around said valve opening, a valve disk in said atmospheric pressure chamber and being adapted and arranged to move into engagement with said valve seat, a movable shaft secured to said disk and projecting through said valve opening into said evacuable chamber, said shaft being constructed and arranged to guide and hold said valve disk in sealing engagement with said valve seat, electromagnetic actuating means coacting with said shaft to move said disk into engagement with said valve seat and to releasably hold said disk in engagement with said valve seat, a compressible sealing gasket partially recessed in said disk, a compression spring on said shaft adjacent to said disk, collar means on said shaft remote from said disk and abutting said compression spring for confining said compression spring between said collar means and said disk, said collar means being constructed and arranged to abut said valve housing in said evacuable chamber and limit movement of said compression spring during movement of said disk into engagement with said valve seat, said compression spring being arranged to be compressed between said valve disk and said confining means during a final portion of the movement of said disk into engagement with said valve seat, said compression spring being effective to initiate movement of said disk out of engagement with said valve seat, a tension spring of lesser strength than said compression spring disposed in said atmospheric pressure chamber, one end of said tension spring being secured to the opposite side of said valve disk from said compression spring, the other end of said tension spring being secured to said valve housing, said tension spring being arranged to be tensioned throughout movement of said disk into engagement with said valve seat and being effective to complete the movement of said disk out of engagement with said valve seat after such movement is initiated by said compression spring.

4. In a solenoid valve assembly especially adapted for vacuum equipment, a valve housing, a partition member dividing said housing into an evacuable chamber and an atmospheric pressure chamber, a valve opening through said partition member, a valve seat in said atmospheric pressure chamber around said opening, a valve disk in said atmospheric pressure chamber and being adapted to move into engagement with said valve seat and close said opening, said valve disk being movable from the seated position to a position spaced from said seat, a movable electromagnetic core shaft fastened to said valve disk and projecting through said opening and into said evacuable chamber, an electromagnetic coil and immovable core constructed and arranged to attract said shaft and cause said shaft to move said valve disk from the position spaced from said valve seat into engagement with said valve seat and to retain said valve disk in engagement with said valve seat, the attractive force of said coil on said shaft increasing through the extent of the movement of said shaft and having a maximum value when said valve disk is in engagement with said valve seat, a compression spring disposed on said shaft with one end of said compression spring facing said valve disk and adjacent thereto, collar means on said shaft and coacting with said valve housing for limiting movement of said compression spring along said shaft away from said valve disk, said compression spring being constructed and arranged to be compressed between said valve disk and said collar means during a final portion of the movement of said valve disk into engagement with said valve seat, a tension spring in said atmospheric pressure chamber, one end of said tension spring being anchored to the opposite side of said valve disk from said compression spring, the other end of said tension spring being anchored to said valve housing, said compression spring being operative through a portion only of the movement of said valve disk and being effective to initiate movement of said valve disk out of engagement with said valve seat against the combined force of a vacuum and atmospheric pressure when said coil is deenergized, said tension spring being of lesser strength than said compression spring and being operative throughout the extent of movement of said valve disk and effective to complete movement of said valve disk from engagement with said valve seat after movement is initiated by said compression spring.

GERHARD R. NAGEL.

REFERENCES CITED

The following references are of record in the file of this patent:

UNITED STATES PATENTS

| Number | Name | Date |
|---|---|---|
| 647,026 | Paul | Apr. 10, 1900 |
| 1,032,352 | House | July 9, 1912 |
| 1,049,845 | Geissinger | Jan. 7, 1913 |
| 1,087,890 | Rogers | Feb. 17, 1914 |
| 1,167,815 | Gold | Jan. 11, 1916 |
| 1,389,056 | Lane | Aug. 30, 1921 |
| 1,464,015 | Schmid | Aug. 7, 1923 |
| 1,701,191 | Ray | Feb. 5, 1929 |
| 1,967,258 | Podbielniak | July 24, 1934 |
| 2,041,416 | Johnson | May 19, 1936 |
| 2,241,747 | Shaw | May 13, 1941 |
| 2,302,624 | Gallagher | Nov. 17, 1942 |
| 2,414,908 | Smith | Jan. 28, 1947 |
| 2,427,439 | Brown | Sept. 16, 1947 |
| 2,427,787 | Hunter | Sept. 23, 1947 |
| 2,427,789 | Kehle | Sept. 23, 1947 |
| 2,436,992 | Ernst | Mar. 2, 1948 |

FOREIGN PATENTS

| Number | Country | Date |
|---|---|---|
| 9,164 | Great Britain | Dec. 22, 1915 |
| 11,477 | Great Britain | Sept. 9, 1886 |
| 40,549 | Germany | Aug. 26, 1887 |